(12) United States Patent
Yang

(10) Patent No.: US 11,906,662 B2
(45) Date of Patent: Feb. 20, 2024

(54) ELECTRONIC DEVICE AND METHOD FOR CONTROLLING ELECTRONIC DEVICE

(71) Applicant: VIVO MOBILE COMMUNICATION CO., LTD., Guangdong (CN)

(72) Inventor: Xuejie Yang, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 255 days.

(21) Appl. No.: 17/467,899

(22) Filed: Sep. 7, 2021

(65) Prior Publication Data

US 2022/0026618 A1 Jan. 27, 2022

Related U.S. Application Data

(63) Continuation of application No. PCT/CN2020/077738, filed on Mar. 4, 2020.

(30) Foreign Application Priority Data

Mar. 8, 2019 (CN) .......................... 201910176245.2

(51) Int. Cl.
*G06F 3/0484* (2022.01)
*G01S 7/481* (2006.01)
*G02B 6/10* (2006.01)
*H04M 1/22* (2006.01)

(52) U.S. Cl.
CPC ............ *G01S 7/4814* (2013.01); *G02B 6/102* (2013.01); *G06F 3/0484* (2013.01); *H04M 1/22* (2013.01); *H04M 2250/12* (2013.01)

(58) Field of Classification Search
CPC ..... G06F 3/0484; G01S 7/4814; G02B 6/102; H04M 1/22; H04M 2250/12
See application file for complete search history.

(56) References Cited

U.S. PATENT DOCUMENTS

| 2011/0057894 A1 | 3/2011 | Yukawa et al. |
| 2018/0260079 A1* | 9/2018 | Zhang ................. H04M 1/0266 |
| 2021/0232244 A1* | 7/2021 | Cotte .................... G06F 3/0412 |

FOREIGN PATENT DOCUMENTS

| CN | 102572066 A | 7/2012 |
| CN | 106878564 A | 6/2017 |
| CN | 206948392 U | 1/2018 |
| CN | 107831901 A | 3/2018 |
| CN | 108769354 A | 11/2018 |

(Continued)

*Primary Examiner* — Robert J Michaud
(74) *Attorney, Agent, or Firm* — Price Heneveld LLP

(57) ABSTRACT

An electronic device and a method for controlling an electronic device are provided. The electronic device includes a first side and a second side facing away from each other, where a frame is between the first side and the second side; the first side is provided with a display module that is at least partially light-permeable, and a gap is between the display module and the frame; a first light emitting device, a second light emitting device, and a light receiving device are inside the electronic device, the first light emitting device and the light receiving device are below the display module and corresponding to a light-permeable display region of display module, the first light emitting device emits a light signal to the outside through the light-permeable display region, and the second light emitting device emits a light signal to the outside through the gap.

20 Claims, 5 Drawing Sheets

(56) References Cited

FOREIGN PATENT DOCUMENTS

| | | | |
|---|---|---|---|
| CN | 109040369 | A | 12/2018 |
| CN | 109101083 | A | 12/2018 |
| CN | 109618031 | A | 4/2019 |
| CN | 109862159 | A | 6/2019 |
| EP | 3373563 | B1 | 12/2017 |

* cited by examiner

ELECTRONIC DEVICE AND METHOD FOR CONTROLLING ELECTRONIC DEVICE

CROSS-REFERENCE TO RELATED APPLICATIONS

This application is continuation application of PCT International Application No. PCT/CN2020/077738 filed on Mar. 4, 2020, which claims priority to Chinese Patent Application No. 201910176245.2, filed in China on Mar. 8, 2019, which are incorporated in their entireties by reference herein.

TECHNICAL FIELD

This disclosure relates to the field of communications technologies, and in particular, to an electronic device and a method for controlling an electronic device.

BACKGROUND

With continuous development of display technology, users are gradually imposing higher requirements on display performance of electronic devices. In order to increase a screen-to-body ratio, the design of full screen (for example, ultra-narrow bezel) has gradually become the mainstream of current researches.

Using a mobile terminal as an example, in the related art, a front cover of a mobile terminal typically includes a frame region for placing components such as a camera or a distance detection sensor (for example, a proximity detection sensor). In order to implement the design of full screen, the components placed in the front cover of the terminal need to be re-arranged.

In order to reduce impact of the distance detection sensor on the screen-to-body ratio, a design scheme of placing a distance detection sensor under a screen is provided in the related art. However, infrared emission under the screen with the screen on has greater impact on the reliability of the screen.

It can be learned that the design scheme of placing a distance detection sensor under the screen in the related art has a problem of relatively great impact on the reliability of the screen.

SUMMARY

Embodiments of this disclosure provide an electronic device and a method for controlling an electronic device, so as to resolve the problem that the design scheme of placing a distance detection sensor under a screen in the related art has a problem of relatively great impact on reliability of the screen.

In order to resolve the foregoing technical problem, this disclosure is implemented as follows:

According to a first aspect, an embodiment of this disclosure further provides an electronic device. The electronic device includes a first side and a second side that are disposed facing away from each other, and a frame is disposed between the first side and the second side.

The first side is provided with a display module, the display module is at least partially light-permeable, and a gap is present between the display module and the frame.

A first light emitting device, a second light emitting device, and a light receiving device are provided inside the electronic device, the first light emitting device and the light receiving device are both disposed below the display module and disposed corresponding to a light-permeable display region of the display module, the first light emitting device emits a light signal to the outside through the light-permeable display region, and the second light emitting device emits a light signal to the outside through the gap.

According to a second aspect, an embodiment of this disclosure further provides a method for controlling an electronic device, applied to the electronic device described above. The method includes:

obtaining a working status of the display module of the electronic device;

controlling the second light emitting device to emit a light signal in a case that the display module of the electronic device is in a light-on state, where the first light emitting device is in an off state; and controlling the first light emitting device to emit a light signal in a case that the display module of the electronic device is in a light-off state, where the second light emitting device is in an off state.

According to a third aspect, an embodiment of this disclosure further provides an electronic device, including a processor, a memory, and a computer program stored in the memory and capable of running on the processor. When the computer program is executed by the processor, the steps of the foregoing method for controlling an electronic device are implemented.

According to a fourth aspect, an embodiment of this disclosure further provides a computer-readable storage medium. The computer-readable storage medium stores a computer program, and when the computer program is executed by the processor, the steps of the foregoing method for controlling an electronic device are implemented.

In the embodiments of this disclosure, the first light emitting device and the light receiving device are both disposed below the display module and disposed corresponding to the light-permeable display region of the display module; the first light emitting device emits a light signal to the outside through the light-permeable display region; and the second light emitting device emits a light signal to the outside through the gap. In this way, the second light emitting device can be used to emit a light signal when the electronic device is in a screen-on state, thereby reducing impact of distance detection on reliability of the screen and the screen-to-body ratio, and also ensuring that implementation of distance detection when the screen of the electronic device is in different states.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments that a person of ordinary skill in the art obtains based on the embodiments of the present disclosure shall fall within the protection scope of the present disclosure.

An embodiment of this disclosure provides an electronic device. The following describes this embodiment of this disclosure with reference to FIG. 1 to FIG. 4.

Figure 1:
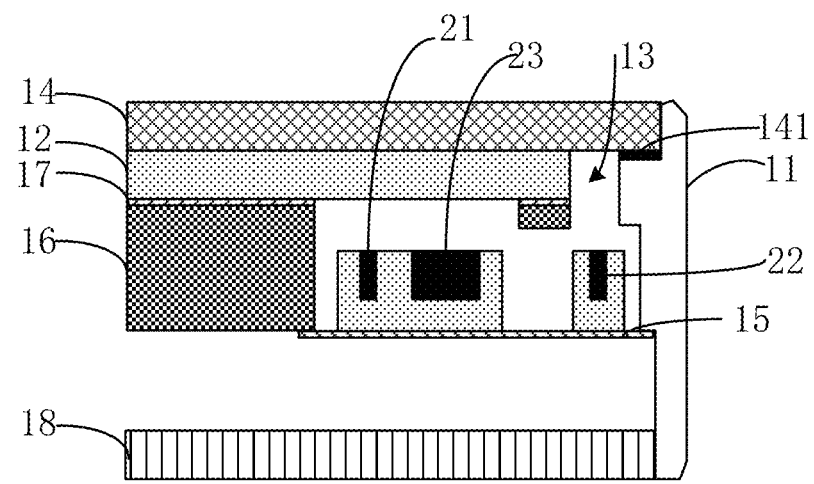
FIG. 1 is a first schematic structural diagram of a cross-section of an electronic device according to an embodiment of this disclosure.

Referring to FIG. 1, FIG. 1 is a schematic cross-sectional view of an electronic device according to an embodiment of this disclosure. As shown in FIG. 1, the electronic device includes a first side and a second side that are disposed facing away from each other, and a frame 11 is disposed between the first side and the second side.

The first side is provided with a display module 12, the display module 12 is at least partially light-permeable, and a gap 13 is present between the display module 12 and the frame 11.

A first light emitting device 21, a second light emitting device 22, and a light receiving device 23 are provided inside the electronic device. The first light emitting device 21 and the light receiving device 23 are both disposed below the display module 12 and disposed corresponding to a light-permeable display region of the display module 12. A light signal is emitted outside the electronic device through the light-permeable display region, and the second light emitting device 22 emits a light signal to the outside through the gap 13.

In this embodiment, the display module 12 may be, but is not limited to, an organic light-emitting diode (OLED) display module.

The first light emitting device 21 and/or the second light emitting device 22 may be an infrared light emitting diode (LED), an infrared laser transmitter, or the like.

The light receiving device 23 may be an infrared receiving sensor. It should be noted that the number of the light receiving devices 23 may be one or at least two, which is not limited in this embodiment. For example, a plurality of light emitting devices may correspond to a same light receiving device, or the light emitting device may be in one-to-one correspondence to the light receiving device.

Specifically, at least part or all of a display region of the display module 12 is light-permeable. The light signal emitted by the first light emitting device 21 passes through the light-permeable display region of the display module 12 and may be received by the light receiving device 23 after being reflected. The light signal emitted by the second light emitting device 22 passes through the gap 13 and may be received by the light receiving device 23 after being reflected.

In practical applications, distance measurement can be implemented by using the first light emitting device 21, the second light emitting device 22, and the light receiving device 23. Optionally, a distance between the electronic device and a reflective object may be calculated based on a time difference between emitting the light signal by the first light emitting device 21 and receiving, by the light receiving device 23, the light signal that is emitted by the first light emitting device 21 and reflected by the reflective object; or a distance between the electronic device and the reflective object may be calculated based on a time difference between emitting the light signal by the second light emitting device 22 and receiving, by the light receiving device 23, the light signal that is emitted by the second light emitting device 22 and reflected by the reflective object.

It should be noted that in a proximity detection process, proximity determining may be performed directly based on a reflection value detected by the light receiving device, or proximity determining may be performed by calculating a distance between the electronic device and the reflective object (for example, the user answering the call) based on the light signal emitted by the second light emitting device and a reflected signal received by the light receiving device. This is not limited in this embodiment.

A distance between the light receiving device 23 and the first light emitting device 21 and a distance between the light receiving device 23 and the second light emitting device 22 may be set properly based on an actual requirement, so as to ensure that the light receiving device 23 can receive light signals that are emitted by the first light emitting device 21 and the second light emitting device 22 and reflected by the reflective object. Optionally, a distance between the second light emitting device 22 and a light receiving midpoint of the light receiving device 23 may be 3 mm to 4.5 mm, thereby improving detection effects for a black reflective object.

Figure 2:
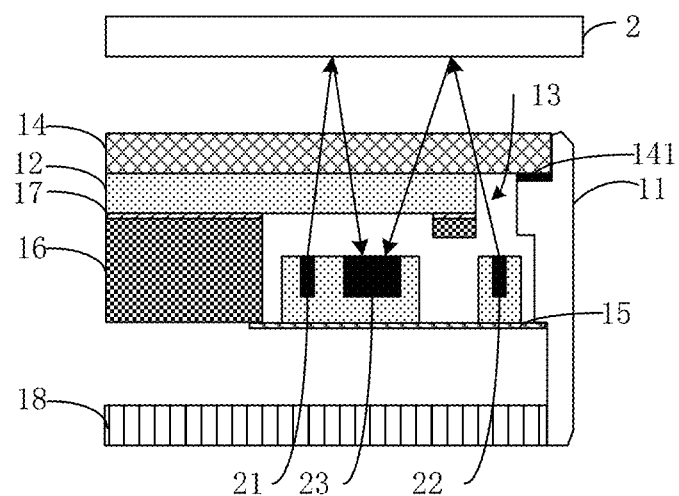
FIG. 2 is a schematic diagram of a light signal propagation path according to an embodiment of this disclosure.

As shown in FIG. 2, the light signal emitted by the first light emitting device 21 may pass through the display module 12, travels outside the electronic device, and then is received by the light receiving device 23 after being reflected by the reflective object 2. The light signal emitted by the second light emitting device 22 may pass through the gap 13, travels outside the electronic device, and then is received by the light receiving device 23 after being reflected by the reflective object 2.

In practical applications, emitting a light signal in the screen-on state, that is, when the screen is displayed, by the light emitting device disposed under the screen easily affects the display of the screen, thereby affecting the reliability of the screen. Therefore, in this embodiment, in a case that the display module 12 of the electronic device is in a light-off state, the first light emitting device 21 located under the display module 12 may be used to emit a light signal; and in a case that the display module 12 of the electronic device is in an on state, the second light emitting device 22 may be used to emit a light signal, thereby reducing impact on the screen from the light emitting device disposed under the screen, and also ensuring implementation of distance detection when the screen of the electronic device is in different states.

In addition, the first light emitting device 21 and the light receiving device 23 are both disposed below the display module 12 and also disposed corresponding to the light-permeable display region of the display module 12; and the second light emitting device 22 is disposed facing towards the gap 13 between the display module 12 and the frame 11, so as to reduce a frame region for placing the devices and reduce impact of the devices on the screen-to-body ratio.

Figure 3:
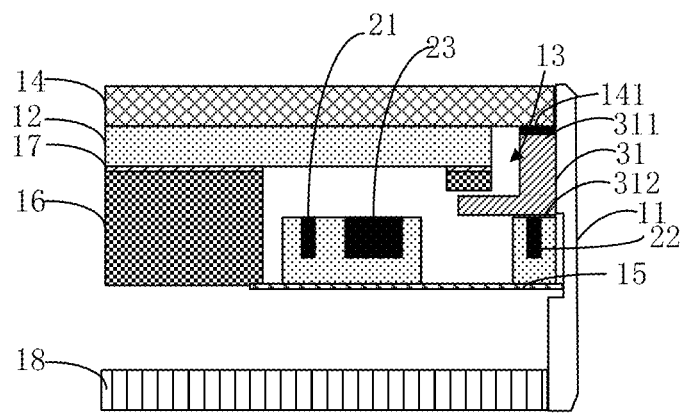
FIG. 3 is a second schematic structural diagram of a cross-section of an electronic device according to an embodiment of this disclosure.

Optionally, as shown in FIG. 3, a light guide rod 31 is provided in the gap 13, and the second light emitting device 22 emits a light signal to the outside through the light guide rod 31 in the gap 13.

In this embodiment, the light signal emitted by the second light emitting device 22 can be received by the light receiving device 23 after passing through the light guide rod 31 and being reflected.

Specifically, a material of the light guide rod 31 may be transparent plastic, transparent acrylic, or the like. The light guide rod 31 may be, but is not limited to, a rectangular structure, an L-shaped structure, or the like. The light guide rod 31 may be fastened on the frame 11 or a mounting bracket. The light guide rod 31 may include a light exit surface 311 facing towards the first side and a light incident surface 312 facing towards the second light emitting device 22. The light signal emitted by the second light emitting device 22 enters the light incident surface 312 of the light guide rod 31 and then travels outside the electronic device through the light exit surface 311 of the light guide rod 31.

In this embodiment, because the light guide rod 31 is disposed in the gap 13 between the display module 12 and the frame 11, and the light signal emitted by the second light emitting device 22 can be conducted to the outside of the electronic device through the light guide rod 31, thereby reducing impact of the second light emitting device on the screen-to-body ratio and also improving the light-focus effect.

Optionally, the electronic device further includes a light-permeable cover plate 14, the light-permeable cover plate 14 is provided with a glue dispensing region 141, the light guide rod 31 is disposed directly opposite the glue dispensing region 141, and a light exit surface 311 of the light guide rod 31 is bonded to the glue dispensing region 141.

In this embodiment, the light-permeable cover plate 14 may be a light-permeable cover plate such as a glass cover plate or an organic plastic cover plate. The light-permeable cover plate 14 is disposed on the first side and may be used to cover the display module 12 of the electronic device, so as to protect the display module 12. The light-permeable cover plate 14 is provided with a glue dispensing region 141. As shown in FIG. 3, the glue dispensing region 141 may be used to secure the light guide rod 31 on the light-permeable cover plate 14.

Optionally, a width of the light exit surface 311 of the light guide rod 31 is less than or equal to a width of the glue dispensing region 141.

In this embodiment, the width of the light exit surface 311 of the light guide rod 31 is less than or equal to the width of the glue dispensing region 141. Therefore, an additional gap does not need to be additionally disposed, thereby further reducing impact of the second light emitting device on the screen-to-body ratio and implementing the narrower-bezel design.

Optionally, the light guide rod 31 and the frame 11 are formed as a whole through injection molding.

In this embodiment, the light guide rod 31 and the frame 11 are formed as a whole through injection molding, thereby ensuring stability of the light guide rod and reducing the width of the gap. Optionally, as shown in FIG. 3, the width of the light exit surface 311 of the light guide rod 31 may be equal to the width of the glue dispensing region 141, thereby improving light exit effects.

Optionally, the light exit surface 311 of the light guide rod 31 comes in contact with the glue dispensing region 141.

In this embodiment, the light exit surface 311 of the light guide rod 31 comes in contact with the glue dispensing region 141, thereby improving light exit effects.

Optionally, a width of the light incident surface 312 of the light guide rod 31 is greater than the width of the light exit surface 311 of the light guide rod 31.

In this embodiment, the width of the light incident surface 312 of the light guide rod 31 is greater than the width of the light exit surface 311 of the light guide rod 31, thereby improving light focus effects. For example, as shown in FIG. 3, the light guide rod 31 has an L-shaped structure.

Optionally, the second light emitting device 22 is disposed directly opposite the light exit surface 311 of the light guide rod 31.

In this embodiment, as shown in FIG. 3, the second light emitting device 22 is disposed directly opposite the light exit surface 311 of the light guide rod 31, thereby improving light exit effects.

Optionally, an infrared light receiving element and an ambient light receiving element are integrated in the light receiving device 23.

In this embodiment, the infrared light receiving element may be used to receive infrared light, which is, for example, infrared light that is emitted by the infrared light emitting element and reflected by a reflective object. Specifically, the infrared light receiving element may cooperate with the infrared light emitting element to implement distance measurement. The ambient light receiving element, such as a photosensitive receiving element, may be used to receive ambient light to implement ambient light detection.

In this embodiment, the infrared light receiving element and the ambient light receiving element are integrated in the light receiving device 23, thereby further reducing impact of the ambient light receiving element on the screen-to-body ratio, improving compactness of the internal space layout of the electronic device, and saving interior space of the electronic device.

Optionally, an infrared light emitting element, an infrared light receiving element, and an ambient light receiving element are integrated in the second light emitting device 22.

In this embodiment, the infrared light emitted by the infrared light emitting element may travel through the gap and then is received by the infrared light receiving element, to implement distance measurement. The ambient light receiving element, such as a photosensitive receiving element, may be used to receive ambient light to implement ambient light detection.

In this embodiment, the infrared light emitting element, the infrared light receiving element, and the ambient light receiving element are integrated in the second light emitting device 22, thereby further reducing impact of the ambient light receiving element on the screen-to-body ratio, also improving compactness of the internal space layout of the electronic device, and reducing interior space of the electronic device.

Figure 4:
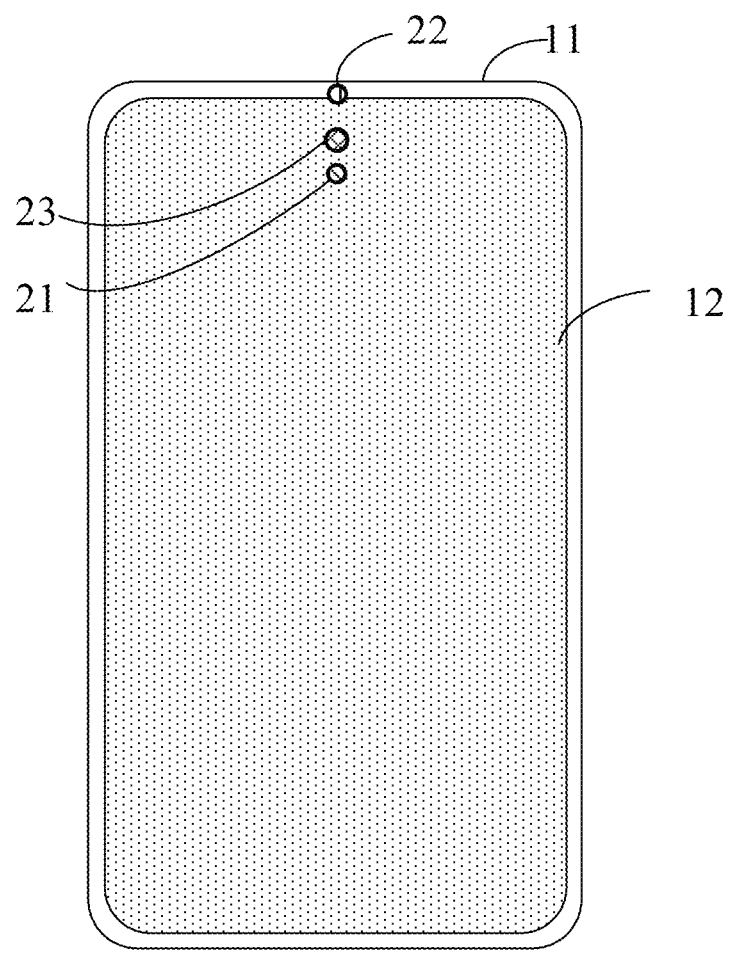
FIG. 4 is a front view of an electronic device according to an embodiment of this disclosure.

Optionally, as shown in FIG. 4, the first light emitting device 21, the second light emitting device 22, and the light receiving device 23 may be disposed in a middle region along the width direction of the electronic device, for example, a middle region of an earpiece end of the electronic device.

In practical applications, when making or receiving a phone call by using the electronic device, a user usually moves the middle region of the earpiece end of the electronic device to the ear. Therefore, disposing the first light emitting device 21, the second light emitting device 22, and the light receiving device 23 in the middle region of the earpiece end of the electronic device leads to a more accurate detection result during proximity detection.

It should be noted that the first light emitting device 21 may be located on an upper side, a lower side, a left side, or a right side of the light receiving device 23, which is not limited in this embodiment. FIG. 4 merely shows that the first light emitting device 21 is located on a lower side of the light receiving device 23.

Optionally, the first light emitting device 21, the second light emitting device 22, and the light receiving device 23 may be fastened on a reinforcing plate 15, a raised bracket, a main board, or the like. Further, the first light emitting device 21, the second light emitting device 22, and the light receiving device 23 can be fastened on the same reinforcing plate, raised bracket, or main board, thereby making the internal layout of the electronic device more simple and compact.

Optionally, as shown in FIG. 1 to FIG. 3, the electronic device may further include but is not limited to a frame support 16, a light-shielding foam 17 provided between the frame support 16 and the display module 12, a back cover 18, and so on. The light-shielding foam 17 may be black light-shielding foam.

The following uses proximity detection for the electronic device (for example, a mobile terminal) as an example to describe this embodiment of this disclosure.

In a case of an incoming call, the display module of the electronic device is in a light-on state, that is, the electronic device is in a screen-on state. In this case, the second light emitting device is controlled to emit a light signal for distance measurement. If it is detected that a distance between the electronic device and the reflective object is greater than or equal to a first preset value, the display module may remain in the light-on state, and the second light emitting device may be continuously controlled to emit a light signal for distance measurement. If it is detected that the distance between the electronic device and the reflective object is less than the first preset value, the display module may be turned off, that is, the screen is turned off, the second light emitting device is turned off, and the first light emitting device is controlled to emit a light signal for distance measurement. The first preset value may be 3 cm.

In a process in which the first light emitting device emits light signals for distance measurement, if it is detected that the distance between the electronic device and the reflective object is less than or equal to a second preset value, the display module may remain in the light-off state, and the first light emitting device may be continuously controlled to emit a light signal for distance measurement. if it is detected that the distance between the electronic device and the reflective object is greater than the second preset value, the display module may be turned on, the first light emitting device is turned off, and the second light emitting device emits light signals for distance measurement. The second preset value may be 5 cm.

It should be noted that proximity determining may be performed directly based on a reflection value detected by the light receiving device, which is not limited in this embodiment.

The design solution of dual-tunnel distance detection provided in this embodiment can not only reduce impact of a distance detection device on the screen-to-body ratio and reliability of the screen, but also ensure a more accurate detection result.

Figure 5:
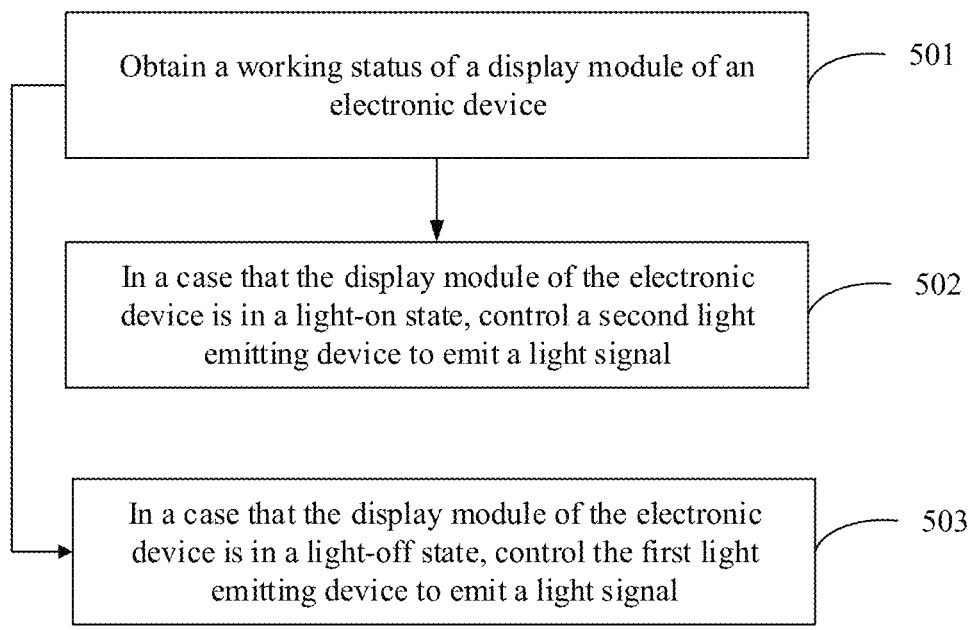
FIG. 5 is a first flowchart of a method for controlling an electronic device according to an embodiment of this disclosure.

An embodiment of this disclosure further provides a method for controlling an electronic device, applied to the electronic device provided in any one of the foregoing embodiments. Referring to FIG. 5, FIG. 5 is a flowchart of a method for controlling an electronic device according to an embodiment of this disclosure. As shown in FIG. 5, the method includes the following steps.

Step 501: Obtain a working status of a display module of an electronic device.

In this embodiment, obtaining the working status of the display module of the electronic device may be performed when a trigger signal for distance detection is received. Specifically, the receiving the trigger signal for distance detection may be receiving an incoming call signal, receiving a preset operation, or the like. The preset operation may be a preset operation for triggering distance measurement, for example, a tapping operation on a distance measurement control. The working status of the display module may include a light-on state and a light-off state.

It should be noted that the obtaining the working status of the display module of the electronic device may also be obtaining performed in other cases.

Step 502: In a case that the display module of the electronic device is in the light-on state, control the second light emitting device to emit a light signal, where the first light emitting device is in the light-off state.

In this step, when the display module of the electronic device is in the light-on state, the second light emitting device may be controlled to emit a light signal to perform distance measurement. In this case, the first light emitting device is in an off state, that is, the first light emitting device does not emit a light signal at this time.

Step 503: In a case that the display module of the electronic device is in the light-off state, control the first light emitting device to emit a light signal, where the second light emitting device is in the turned-off state.

In this step, when the display module of the electronic device is in the light-off state, the first light emitting device may be controlled to emit a light signal to perform distance measurement. In this case, the second light emitting device is in an off state, that is, the second light emitting device does not emit a light signal at this time.

It should be noted that the electronic device in this embodiment may include a structural composition of the electronic device in any one of the foregoing embodiments, with the same technical effects achieved. In order to avoid repetition, details are not described herein again. In the method for controlling an electronic device provided in this embodiment of this disclosure, the first light emitting device is controlled to emit a light signal in a case that the display module is in the light-off state; and the second light emitting device is controlled to emit a light signal in a case that the display module is in the light-on state. This can not only reduce impact of distance detection on the reliability of the screen, but also ensure a more accurate detection result.

Optionally, after the controlling the second light emitting device to emit a light signal in the case that the display module of the electronic device is in the light-on state, the method may further include:

in a case that the display module of the electronic device is detected to have switched to the light-off state, controlling the first light emitting device to emit a light signal, and turning off the second light emitting device.

After the controlling the first light emitting device to emit a light signal in the case that the display module of the electronic device is in the light-off state, the method may further include:

in a case that the display module of the electronic device is detected to have switched to the light-on state, controlling the second light emitting device to emit a light signal, and turn off the first light emitting device.

In this embodiment, in a continuous distance measurement process, if it is detected that the display module changes from the light-on state to the light-off state, the first light emitting device may be controlled to emit a light signal, and the second light emitting device may be turned off, thereby improving accuracy of a detection result. If it is detected that the display module changes from the light-off state to the light-on state, the processor may control the second light emitting device to emit a light signal, and turns off the first light emitting device, thereby reducing impact of the distance detection on the reliability of the screen.

Figure 6:
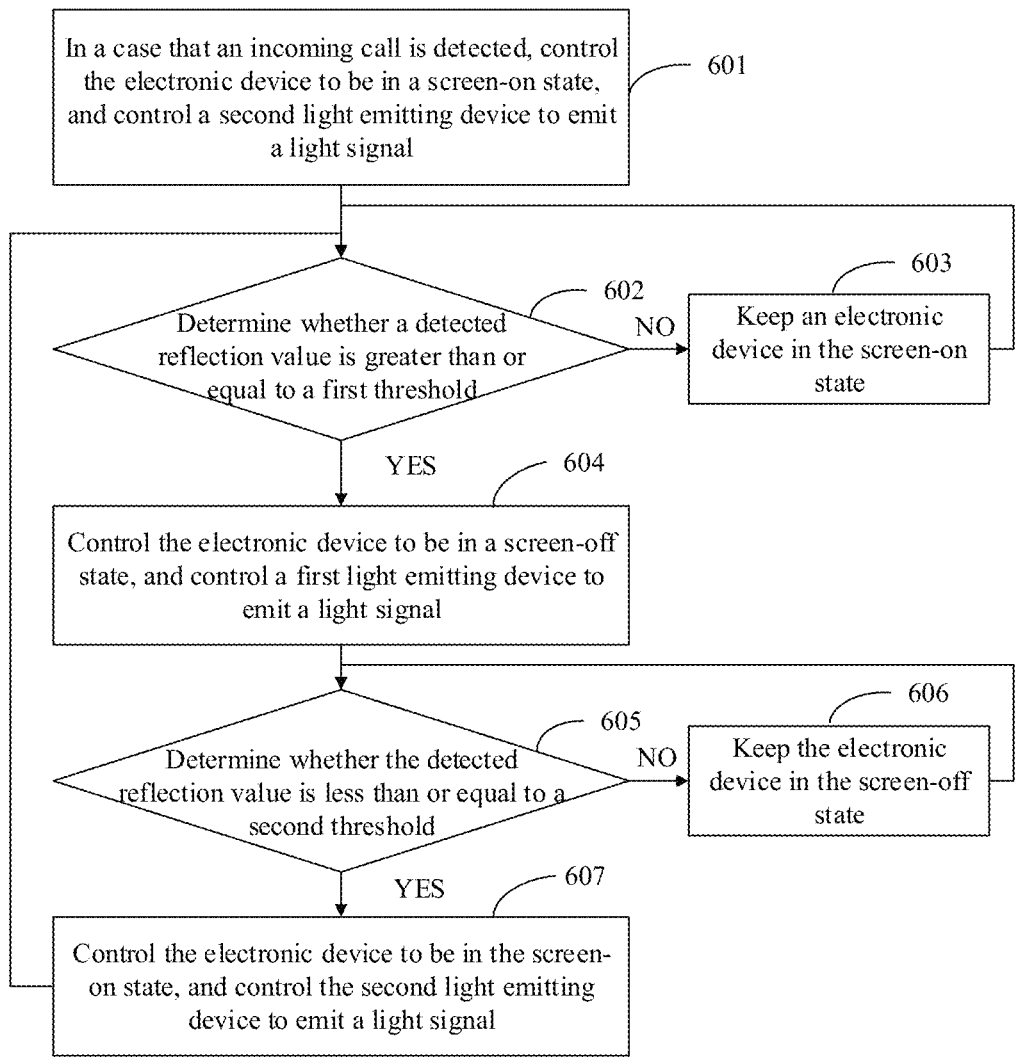
FIG. 6 is a second flowchart of a method for controlling an electronic device according to an embodiment of this disclosure.

The following uses proximity detection for the electronic device (for example, a mobile terminal) as an example to describe this embodiment of this disclosure. As shown in FIG. 6, the method for controlling an electronic device provided in this embodiment of this disclosure includes the following steps.

Step 601: In a case that an incoming call is detected, control the electronic device to be in a screen-on state, and control the second light emitting device to emit a light signal.

In this step, when the electronic device detects an incoming call, if the electronic device is in the screen-off state, the electronic device may be controlled to enter the screen-on state, and if the electronic device is already in the screen-on state, the electronic device may remain in the screen-on state, the second light emitting device is controlled to emit a light signal, and the light receiving device receives the light signal that is emitted by the second light emitting device and reflected by the reflective object.

In practical applications, in the case of an incoming call, the user usually moves the electronic device close to the ear to answer the call. In this case, the second light emitting device emits a light signal for proximity determining, so as to detect whether the electronic device is close to the ear of the user or detect whether the electronic device is far away from the ear of the user.

In this embodiment, proximity determining may be performed directly based on a reflection value detected by the light receiving device, or proximity determining may be performed by calculating a distance between the electronic device and the reflective object (for example, the user answering the call) based on the light signal emitted by the second light emitting device and a reflected signal received by the light receiving device.

It should be noted that a closer distance between the electronic device and the reflective object (for example, the user answering the call) indicates a greater reflection value detected by the light receiving device. This embodiment is described below by using proximity determining based on the reflection value detected by the light receiving device as an example.

Step 602: Determine whether the detected reflection value is greater than or equal to a first threshold.

In this embodiment, the light receiving device may include a photo diode (PD), and the detected reflection value may be a reflection value detected by the PD. The first threshold may be set based on actual requirements. For example, the first threshold may be a reflection value corresponding to a distance of 3 cm.

In this step, in a case that the detected reflection value is less than the first threshold, it indicates a current state being still far away, and step 603 may be performed. When the detected reflection value is greater than or equal to the first threshold, step 604 is performed.

Step 603: Keep the electronic device in the screen-on state.

In this step, the electronic device may remain in the screen-on state, and the second light emitting device is still used to emit a light signal. After the detected reflection value is obtained, proceed with step 602.

Step 604: Control the electronic device to be in the screen-off state, and control the first light emitting device to emit a light signal.

In this step, in a case that the detected reflection value is greater than or equal to the first threshold, it indicates a current state being close; the electronic device may be controlled to be in the screen-off state, the first light emitting device may be controlled to emit a light signal, and the light receiving device may receive a light signal that is emitted by the first light emitting device and reflected by the reflective object. In this case, the second light emitting device is in the turned-off state.

Step 605: Determine whether the detected reflection value is less than or equal to a second threshold.

In this embodiment, the second threshold may be set properly based on an actual requirement, for example, being a reflection value corresponding to a distance of 5 cm.

In this step, in the case that the first light emitting device emits a light signal and the reflection value detected by the light receiving device is greater than the second threshold, it indicates a current state being close, and step 606 is performed; otherwise, step 607 is performed.

Step 606: Keep the electronic device in the screen-off state.

In this step, the electronic device may remain in the screen-off state, and the first light emitting device is still used to emit a light signal. After the detected reflection value is obtained, proceed with step 605.

Step 607: Control the electronic device to be in the screen-on state, and control the second light emitting device to emit a light signal.

In this step, in the case that the detected reflection value is less than or equal to the second threshold, it indicates a current state being far away, and the electronic device may be controlled to be in the screen-on state, and the second light emitting device may be controlled to emit a light signal. In this case, the first light emitting device is in the turned-off state.

It should be noted that proximity detection may be stopped in a case that termination of the call is detected.

Figure 7:
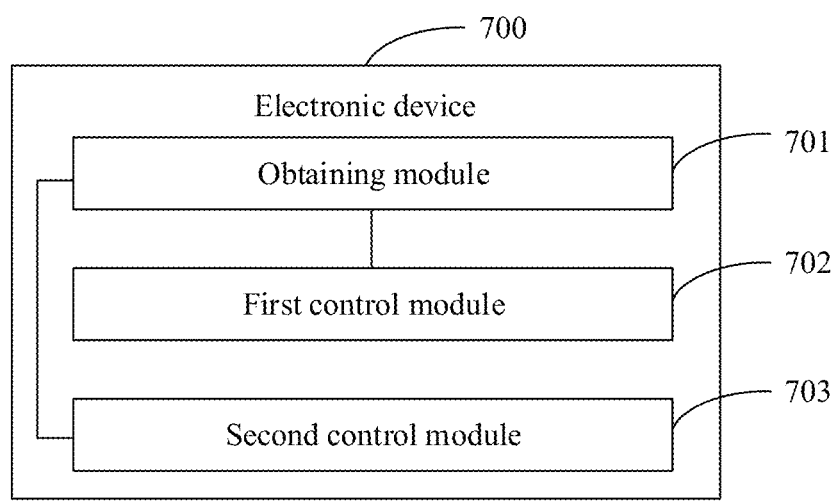
FIG. 7 is a structural diagram of an electronic device according to an embodiment of this disclosure.

Referring to FIG. 7, FIG. 7 is a structural diagram of an electronic device according to an embodiment of this disclosure. As shown in FIG. 7, the electronic device 700 includes:

an obtaining module 701, configured to obtain a working status of a display module of the electronic device;

a first control module 702, configured to: control a second light emitting device to emit a light signal in a case that the display module of the electronic device is in a light-on state, where a first light emitting device is in an off state; and a second control module 703, configured to: control the first light emitting device to emit a light signal in a case that the display module of the electronic device is in a light-off state, where the second light emitting device is in an off state.

Optionally, the electronic device may further include:

a third control module, configured to: after the second light emitting device is controlled to emit a light signal in the case that the display module of the electronic device is in the light-on state, in a case that the display module of the electronic device is detected to have switched to the light-off state, control the first light emitting device to emit a light signal, and turn off the second light emitting device.

The electronic device may further include:

a fourth control module, configured to: after the first light emitting device is controlled to emit a light signal in the case that the display module of the electronic device is in the light-off state, in a case that the display module of the electronic device is detected to have switched to the light-on state, control the second light emitting device to emit a light signal, and turn off the first light emitting device.

The electronic device 700 provided in this embodiment of this disclosure is capable of implementing processes that are implemented by the electronic device in the foregoing method embodiment. To avoid repetition, details are not described herein again.

In the electronic device 700 in this embodiment of this disclosure, the obtaining module 701 is configured to receive the trigger signal for distance detection and obtain the working status of the display module of the electronic device; the first control module 702 is configured to: control the second light emitting device to emit a light signal in a case that the display module of the electronic device is in a light-on state; and the second control module 703 is configured to: control the first light emitting device to emit a light signal in a case that the display module of the electronic device is in a light-off state. This can not only reduce impact of distance detection on the reliability of the screen and the screen-to-body ratio, but also ensure a more accurate detection result when the screen of the electronic device is in different states.

Optionally, an embodiment of this disclosure further provides an electronic device, including a memory, a processor, and a computer program stored in the memory and capable of running on the processor. When the computer program is executed by the processor, the processes of the foregoing embodiment of the method for controlling an electronic device are implemented, with the same technical effect achieved. To avoid repetition, details are not described herein again.

An embodiment of this disclosure further provides a computer-readable storage medium, where a computer program is stored in the computer-readable storage medium. When the computer program is executed by a processor, the processes of the foregoing embodiment of the method for controlling an electronic device are implemented, with the same technical effects achieved. To avoid repetition, details are not described again herein. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of the present disclosure are described above with reference to the accompanying drawings, but the present disclosure is not limited to such embodiments. The embodiments are only illustrative rather than restrictive. Inspired by the present disclosure, a person of ordinary skill in the art can still derive a plurality of variations without departing from the essence of the present disclosure and the protection scope of the claims. All these variations shall fall within the protection of the present disclosure.

What is claimed is:

1. An electronic device, comprising a first side and a second side that are disposed facing away from each other, wherein a frame is disposed between the first side and the second side;
   the first side is provided with a display module, the display module is at least partially light-permeable, and a gap is present between the display module and the frame; and
   a first light emitting device, a second light emitting device, and a light receiving device are provided inside the electronic device, the first light emitting device and the light receiving device are both disposed below the display module and disposed corresponding to a light-permeable display region of the display module, the first light emitting device emits a light signal to the outside through the light-permeable display region, and the second light emitting device emits a light signal to the outside through the gap;
   wherein the first light emitting device is configured to emit a light signal in a case that the display module of the electronic device is in a light-off state, and the second light emitting device is configured to emit a light signal in a case that the display module of the electronic device is in a light-on state.

2. The electronic device according to claim 1, wherein a light guide rod is provided in the gap, and the second light emitting device emits a light signal to the outside through the light guide rod in the gap.

3. The electronic device according to claim 2, further comprising a light-permeable cover plate, wherein the light-permeable cover plate is provided with a glue dispensing region, the light guide rod is disposed directly opposite the glue dispensing region, and a light exit surface of the light guide rod is bonded to the glue dispensing region.

4. The electronic device according to claim 3, wherein a width of the light exit surface of the light guide rod is less than or equal to a width of the glue dispensing region.

5. The electronic device according to claim 2, wherein a width of a light incident surface of the light guide rod is greater than a width of the light exit surface of the light guide rod.

6. The electronic device according to claim 2, wherein the light guide rod and the frame are formed as a whole through injection molding.

7. The electronic device according to claim 1, wherein an infrared light receiving element and an ambient light receiving element are integrated in the light receiving device.

8. The electronic device according to claim 1, wherein an infrared light emitting element, an infrared light receiving element, and an ambient light receiving element are integrated in the second light emitting device.

9. A method for controlling an electronic device, applied to the electronic device according to claim 1, wherein the method comprises:
- obtaining a working status of the display module of the electronic device;
- controlling the second light emitting device to emit a light signal in a case that the display module of the electronic device is in the light-on state, wherein the first light emitting device is in an off state; and
- controlling the first light emitting device to emit a light signal in a case that the display module of the electronic device is in the light-off state, wherein the second light emitting device is in an off state.

10. The method according to claim 9, wherein after the controlling the second light emitting device to emit a light signal in a case that the display module of the electronic device is in the light-on state, the method further comprises:
- in a case that the display module of the electronic device is detected to have switched to the light-off state, controlling the first light emitting device to emit a light signal, and turning off the second light emitting device; and
- after the controlling the first light emitting device to emit a light signal in a case that the display module of the electronic device is in the light-off state, the method further comprises:
- in a case that the display module of the electronic device is detected to have switched to the light-on state, controlling the second light emitting device to emit a light signal and turning off the first light emitting device.

11. A non-transitory computer-readable storage medium, wherein the computer-readable storage medium stores a computer program, and when the computer program is executed by a processor, the steps of the method for controlling an electronic device according to claim 9 are implemented.

12. An electronic device, comprising a first side and a second side that are disposed facing away from each other, wherein a frame is disposed between the first side and the second side;
- the first side is provided with a display module, the display module is at least partially light-permeable, and a gap is present between the display module and the frame; and
- a first light emitting device, a second light emitting device, and a light receiving device are provided inside the electronic device, the first light emitting device and the light receiving device are both disposed below the display module and disposed corresponding to a light-permeable display region of the display module, the first light emitting device emits a light signal to the outside through the light-permeable display region, and the second light emitting device emits a light signal to the outside through the gap;
- wherein the electronic device further comprises a processor, a memory, and a computer program stored in the memory and capable of running on the processor, wherein when the computer program is executed by the processor, the steps of a method for controlling an electronic device are implemented, wherein the method for controlling the electronic device comprises:
  - obtaining a working status of the display module of the electronic device;
  - controlling the second light emitting device to emit a light signal in a case that the display module of the electronic device is in a light-on state, wherein the first light emitting device is in an off state; and
  - controlling the first light emitting device to emit a light signal in a case that the display module of the electronic device is in a light-off state, wherein the second light emitting device is in an off state.

13. The electronic device according to claim 12, wherein after the controlling the second light emitting device to emit a light signal in a case that the display module of the electronic device is in a light-on state, the method further comprises:
- in a case that the display module of the electronic device is detected to have switched to the light-off state, controlling the first light emitting device to emit a light signal, and turning off the second light emitting device; and
- after the controlling the first light emitting device to emit a light signal in a case that the display module of the electronic device is in a light-off state, the method further comprises:
- in a case that the display module of the electronic device is detected to have switched to the light-on state, controlling the second light emitting device to emit a light signal and turning off the first light emitting device.

14. The electronic device according to claim 12, wherein a light guide rod is provided in the gap, and the second light emitting device emits a light signal to the outside through the light guide rod in the gap.

15. The electronic device according to claim 14, further comprising a light-permeable cover plate, wherein the light-permeable cover plate is provided with a glue dispensing region, the light guide rod is disposed directly opposite the glue dispensing region, and a light exit surface of the light guide rod is bonded to the glue dispensing region.

16. The electronic device according to claim 15, wherein a width of the light exit surface of the light guide rod is less than or equal to a width of the glue dispensing region.

17. The electronic device according to claim 14, wherein a width of a light incident surface of the light guide rod is greater than a width of the light exit surface of the light guide rod.

18. The electronic device according to claim 14, wherein the light guide rod and the frame are formed as a whole through injection molding.

19. The electronic device according to claim 12, wherein an infrared light receiving element and an ambient light receiving element are integrated in the light receiving device.

20. The electronic device according to claim 12, wherein an infrared light emitting element, an infrared light receiving element, and an ambient light receiving element are integrated in the second light emitting device.

* * * * *